(12) United States Patent
Zulehner et al.

(10) Patent No.: US 7,846,379 B2
(45) Date of Patent: Dec. 7, 2010

(54) INDUSTRIAL FURNACE

(75) Inventors: Uwe Zulehner, Kempen (DE); Hans Rinnhofer, Euskirchen (DE)

(73) Assignee: Andritz Maerz GmbH (DE)

( * ) Notice: Subject to any disclaimer, the term of this patent is extended or adjusted under 35 U.S.C. 154(b) by 425 days.

(21) Appl. No.: 10/569,293

(22) PCT Filed: Jul. 8, 2004

(86) PCT No.: PCT/EP2004/007452

§ 371 (c)(1),
(2), (4) Date: Aug. 14, 2006

(87) PCT Pub. No.: WO2005/031234

PCT Pub. Date: Apr. 7, 2005

(65) Prior Publication Data

US 2007/0042312 A1   Feb. 22, 2007

(30) Foreign Application Priority Data

Aug. 30, 2003   (DE) ................. 103 40 087

(51) Int. Cl.
C21B 11/06 (2006.01)
C21B 13/08 (2006.01)
C22B 1/216 (2006.01)
C22B 1/00 (2006.01)
C22B 3/00 (2006.01)
C22B 5/00 (2006.01)
C22B 21/00 (2006.01)
C21C 1/00 (2006.01)
C21C 7/00 (2006.01)

(52) U.S. Cl. .............. 266/163; 266/161; 266/200; 266/213; 266/216

(58) Field of Classification Search .............. 266/163, 266/200, 161, 213, 216; 432/121
See application file for complete search history.

(56) References Cited

U.S. PATENT DOCUMENTS

| 942,346 A | 12/1909 | Peirce et al. ............ 266/47 |
| 943,403 A | 12/1909 | Grunwald |
| 1,546,964 A | 7/1925 | Blessing |
| 1,856,716 A | 5/1932 | Maschmeyer |
| 3,743,265 A | 7/1973 | Tanoue et al. ............ 266/36 H |
| 4,245,821 A | 1/1981 | Kappell et al. ............ 266/163 |
| 6,203,315 B1 | 3/2001 | Magnusson ............ 432/105 |

FOREIGN PATENT DOCUMENTS

| DE | 1031473 | 6/1954 |
| DE | 2146410 | 3/1973 |
| DE | 69230406 T | 6/2000 |
| GB | 356422 | 9/1931 |
| WO | WO 91/15607 | 10/1991 |

*Primary Examiner*—Roy King
*Assistant Examiner*—Caitlin Fogarty
(74) *Attorney, Agent, or Firm*—Kusner & Jaffe (57) ABSTRACT

The invention relates to an industrial furnace for melting and gas-treating nonferrous metals.

17 Claims, 5 Drawing Sheets

Fig. 2

INDUSTRIAL FURNACE

The invention relates to an industrial furnace for melting and gas-treating nonferrous metals.

Various types of furnaces are known from the state of the art for primary and secondary metallurgical treatment of nonferrous metals such as copper (for producing anode copper or blister copper here, for example), lead, zinc, tin, nickel or aluminum or alloys thereof. One of these types of furnaces is the so-called drum type furnace (rotary furnace) which is used in particular for refining copper (i.e. for oxidation and reduction). Another type of furnace is, for example, the so-called tilting furnace which is used for smelting copper scrap and for refining the melt obtained therefrom. Corresponding types of furnaces are also used for melting, for treating and for processing other nonferrous metals. Drum type furnaces are used in particular for refining liquid nonferrous metal melts which are fed into the drum furnace from an upstream melting furnace. In some cases solid recycled material is also charged to the furnace.

A drum type furnace is essentially like a steel pipe that is sealed at both its axial end sections and can rotate about its longitudinal horizontal axis. On the inside the pipe is lined with a refractory material so that a cylindrical free interior space remains.

This cylindrical interior space forms a channel for the nonferrous metal melt on its lower side where the nonferrous metal melt can be processed, i.e., in particular refined (oxidized and reduced), alloyed or homogenized, for example.

This treatment process (i.e., in particular refining, alloying and homogenizing) takes place essentially by spraying gas into the melt from nozzles located beneath the surface of the bath of the nonferrous metal melt, so-called underbath nozzles or submerged nozzles, or from lances immersed into the melt from above.

The gas used to oxidize the copper melt or other nonferrous metal melt is in particular oxygen, air or some other reactive gas, e.g., chlorine gas, where the gas reacts with foreign substances in the nonferrous metal melt as it flows through the melt so that these substances are either deposited as a corresponding reaction product or as slag on the surface of the melt or leave the aggregate in the form of airborne dust or process exhaust gas. Airborne dust and process exhaust gas can leave the aggregate, e.g., through the combustion gas vent.

To homogenize the nonferrous metal melt, an inert gas, e.g., nitrogen or argon may be sprayed into the melt cumulatively or alternatively through the nozzles, whereby the inert gas causes mixing and homogenization of the nonferrous metal melt as it flows through it.

For reduction of a nonferrous metal melt, a reducing gas, e.g., natural gas, LPG, ammonia, hydrogen or liquid hydrocarbons (oils) may be sprayed into the nonferrous metal melt.

An efficient treatment of the melt may be performed if the gas flows through the melt for a sufficient period of time. The time needed by the gas to rise from its injection point at the lower end of the melt bath up to the surface of the bath is determined essentially by the height of the bath, so a minimum bath height at which an adequate flow time of the injected gas through the bath is ensured is necessary.

To divert the nonferrous metal melt out of the drum furnace, this furnace has openings out of which the nonferrous metal melt can flow after the furnace has rotated about its longitudinal axis by such a large angle of rotation until the nonferrous metal melt has reached these openings.

Drum furnaces are very suitable for the aforementioned treatment of nonferrous metal melt by gas injection, but are not suitable for smelting nonferrous scrap metal or solid material in the charge. Rapid and efficient melting/dissolving of nonferrous scrap metal could be performed efficiently only in the upper areas of the nonferrous metal melt bath that is fired directly by the burners opening into the free interior above the nonferrous metal melt bath. Because of the required minimum bath height, however, the nonferrous scrap metal sinks at least partially in the nonferrous metal melt so the nonferrous scrap metal cannot be smelted, i.e., melted rapidly and efficiently on the whole.

For smelting nonferrous scrap metal, therefore preferably an additional furnace is required. In addition to a blast furnace, the so-called (stationary) flame hearth furnace or the (tiltable) tilt furnace is used in particular as the corresponding furnace for smelting nonferrous scrap iron or solid charge material. In the tilting furnace, nonferrous scrap metal is smelted at a relatively low bath height and with a large bath surface of the nonferrous metal melt. Although adequate refining or other treatment of the nonferrous metal melt through underbath nozzles is possible by tilting the furnace, this is a relatively inefficient method because of the low bath height. To remove the nonferrous metal melt from the tilting furnace, it may be tilted by a few angular degrees.

The object of the present invention is to make available an industrial furnace in which a nonferrous metal, e.g., copper is efficiently processed by using a gas, i.e., is efficiently refined and homogenized, while at the same time it is possible to smelt scrap metal.

To achieve this object, an industrial furnace for smelting and for gas treatment of nonferrous metals having the following features is made available according to the present invention:

a steel jacket,
a refractory lining situated on the inside of the steel jacket, enclosing a free interior space,
at least one device for supplying gas to the interior,
at least one burner for firing the interior,
the furnace is mounted to rotate about a horizontal axis of rotation by an angle of rotation amounting to at least 40°,
the interior has a noncircular cross-sectional area.

This invention is based on the finding that the drum furnaces used in the past essentially for gas treatment of nonferrous metals can be optimized to the extent that both the process step of melting as well as refining and gas treatment can each be implemented more efficiently if the interior of the furnace has a noncircular cross section.

The ratio of the bath surface of the metal melt bath to the depth of the bath always remains the same during the rotational movement of a drum furnace according to the state of the art (due to the circular cross-sectional area of the interior) even when the furnace is rotating about its longitudinal axis, but in the case of a furnace whose interior has a noncircular cross-sectional area, this ratio may be altered by rotation of the furnace about its axis of rotation.

In particular, the cross-sectional area of such a furnace may be of such dimensions that the furnace is rotatable into a first position in which the ratio of the bath surface of a nonferrous metal melt (hereinafter also referred to simply as "metal melt") present in the interior to the depth of the bath is greater (hereinafter also referred to as "melting position") than in a second position of the furnace (hereinafter also referred to as "gas treatment position") into which the furnace is also rotatable.

The melting position is characterized in that the ratio of the bath surface of the melt to the depth of the bath (i.e., the bath volume) is greater than that in the gas treatment position, assuming the same volume of the melt.

By rotating the furnace about its axis of rotation, the furnace is rotatable from its melting position into its gas treatment position and back. Measures are preferably taken to ensure that the furnace can be rotated from its melting position into its gas treatment position and back by means of a 90° revolution about its axis of rotation. According to the present invention, however, it has been found that an adequate change in the ratio of the bath surface of a metal melt present in the interior to its depth (and/or volume) can be achieved by a revolution of at least 40°, so that a nonferrous metal can be efficiently melted in the melting position and can be treated in the gas treatment position after a revolution of 40°.

Therefore, according to the present invention, the inventive industrial furnace is mounted so it can rotate by an angle of rotation of at least 40° about the horizontal axis of rotation. Accordingly, the furnace may also be rotatable by an angle of rotation of at least 50°, 70°, 90°, 120°, 160° or 180°. Since rotatability of the furnace is also necessary to move the furnace into a position in which metal melt can be diverted from an opening to the outside (casting position), so the furnace may also be rotatable by an angle between 40° and 120° or between 70° and 120°, for example, to be able to rotate it back and forth between the melting position and the gas treatment position and it may be rotatable by an angle between 40° and 180° or between 90° and 180° to be able to rotate it back and forth between the melting position and the casting position.

The furnace has at least one device for supplying gas to the interior, e.g., under-bath nozzles through which a nonferrous metal melt present in the interior can be treated in the gas treatment position. Cumulatively, the furnace may have at least one other device for supplying gas to the interior through which the nonferrous metal melt can also be treated in the melting position.

At a uniform volume of the metal melt bath, the cross-sectional area of the furnace may be designed to be of such dimensions that when in the melting position of the furnace, the metal melt has such a large bath surface area and such a small bath depth that nonferrous scrap metal can be smelted and in the gas treatment position it has such a great bath height that gas which is sprayed through the devices for supplying gas into the interior at the bottom of the bath is sprayed into the metal melt bath in this position, flows through the metal melt bath for a sufficient length of time to treat the metal melt bath (i.e., in particular to refine, alloy and homogeneously mix it).

The furnace can be rotated back and forth from the melting position to the gas treatment position, so the inventive furnace may be used as a furnace for smelting and also at the same time as a furnace for gas treatment of nonferrous metals.

The furnace according to the present invention may essentially have any noncircular cross-sectional area, whereby the cross-sectional area is in a geometric plane perpendicular to the axis of rotation.

The cross-sectional area may be the same or different over the entire length of the interior. For example, the cross-sectional area may be designed differently at different points in the interior, whereby these different cross-sectional areas may develop one into the other along straight or curved lines, for example.

According to one embodiment of this invention, the interior of the furnace has a circular cross-sectional area (e.g., at one or both of its axial end areas), each developing into a noncircular cross-sectional area toward the center of the furnace. The interior of the furnace may also have a noncircular cross-sectional area in only some sections accordingly.

Owing to its noncircular cross-sectional area, the interior of the furnace (necessarily) has different diameters. With that it can be provided here for the cross-sectional area to have exactly one maximum diameter and exactly one minimum diameter, each optionally developing into one another along straight or curved line, for example. If the maximum diameter and the minimum diameter show a smooth transition along a straight line, then this cross-sectional area is to a rhombus. If the maximum diameter and the minimum diameter show a smooth transition along curved lines (continuous), then the cross-sectional area corresponds to an ellipse or an oval.

According to a preferred embodiment, the maximum diameter and the minimum diameter of the cross-sectional area may also run at an angle of 90° to one another. Essentially, however, the two diameters may form any desired angle to one another, e.g., they may form an angle between 30° and 90°, between 60° and 90° or between 80° and 90° (the angle values given are each based on the smaller angle enclosed by the two diameters).

In addition to the elliptical, oval or rhombohedral cross-sectional area mentioned above, optionally belonging to the interior of the furnace, it may also have a pear-shaped or polygonal cross-sectional area, for example. The interior may have as the polygonal cross-sectional area a triangular, quadrilateral, pentagonal or hexagonal cross-sectional area, for example.

The interior of the inventive furnace may preferably, however, have an elliptical or oval cross-sectional area. In the case of an elliptical or oval cross-sectional area of the interior, the longer of the two main axes of the ellipsis and/or the oval may be between 1.2 and 3 or between 1.6 and 2.4 times longer than the shorter of the two main axes.

According to a preferred embodiment, the maximum diameter of the cross-sectional area of the interior is arranged horizontally in the melting position of the furnace. In other words, in the melting position, the bath surface of a metal melt in the interior of the furnace runs parallel to the maximum diameter. However, any other position which is favorable for melting or refining may also be used.

Accordingly, in another preferred embodiment, the minimum diameter of the cross-sectional area of the interior may be arranged horizontally in the gas treatment position of the furnace. In other words, in the gas treatment position, the bath surface of a metal melt in the interior of the furnace runs parallel to the minimum diameter.

In the case of an interior having an elliptical or oval cross-sectional area, the longer of the two main axes runs horizontally in the melting position of the furnace accordingly, with the shorter of the main axes running horizontally in the gas treatment position of the furnace.

The interior of the furnace may be in the shape of a cylinder, for example, having any noncircular cross-sectional area. The interior of the furnace is preferably in the form of a cylinder with an elliptical or oval cross-sectional area. In the case of the latter shape of the interior, the axis of the cylinder may run parallel to the axis of rotation of the furnace.

According to one embodiment, the interior is in the shape of an ellipsoid.

The furnace has at least one device for supplying gas into the interior (hereinafter also referred to merely as "gas supply device"). The gas is used for treatment of the metal melt, i.e., in particular for refining, alloying or homogeneous mixing of the melt. Such a gas supply device may consist of one or more nozzles, e.g., submerged nozzles or gas purging plugs, each of which is known from the state of the art for treatment of a metal melt. The nozzles and/or gas purging plugs may each receive the gas individually or combined into groups.

For oxidation of the metal melt in the interior of the furnace, a reactive gas, in particular air, oxygen, chlorine gas or mixtures thereof may be supplied to the metal melt through the gas supply device.

To improve the homogeneous mixing effect (homogenization) and/or to make the metal melt more uniform, an inert gas (e.g., nitrogen or argon) may be injected into the metal melt through the gas supply devices either cumulatively or alternatively.

In addition, any suitable reducing gas, e.g., natural gas, LPG, ammonia, hydrogen or liquid hydrocarbons (oils) may be injected into the metal melt for reduction of the metal melt.

The gas supply devices may open into the interior in two areas in particular:

First, the gas supply devices (hereinafter also referred to merely as "gas-treatment-position gas supply devices") may open into the interior in an area which is situated beneath the bath surface of the melt bath in the gas treatment position. These gas-treatment-position gas supply devices are provided so that gas can be supplied to them metal melt in the gas treatment position. It is preferable for the gas-treatment-position gas supply devices to be situated above the bath surface of the melting bath in the melting position.

Secondly, gas supply devices (hereinafter also referred to as "melting-position gas supply devices") may open into the interior in an area which is below the bath surface of the melting bath when in the melting position. These melting-position gas supply devices are provided for supplying gas to the metal melt when in the melting position. It is also preferable for the melting-position gas supply devices to be situated above the bath surface of the melting bath when in the gas treatment position.

A prerefining or premixing of the metal melt can be accomplished already in the melting position of the furnace due to the melting-position gas supply devices.

The gas supply devices may open into the interior along a path, i.e., along a line.

The devices for supplying gas are preferably situated along several paths.

These paths may run essentially parallel to one another, for example, and may run essentially parallel to the axis of rotation, for example.

The melting-position gas supply devices as well as the gas-treatment-position gas supply devices may each open into the interior along one or more paths. The gas-treatment-position gas supply devices may be arranged along multiple paths, for example, in such a way that they open into the interior in an offset arrangement with respect to neighboring paths. Therefore the gas can be introduced into the nonferrous metal melt in a very uniform distribution. The same thing is also true accordingly of the arrangement of the melting-position gas supply devices.

It is preferably possible to provide for the area in which the gas-treatment-position gas supply devices open into the interior and the area in which the melting-position gas supply devices open into the interior to be arranged so they are offset in relation to one another by a defined angle of rotation (the reference point for determination of the angle of rotation in one area is defined as its central axis running parallel to the axis of rotation). It is possible to provide here for these two areas to be arranged with an offset in relation to one another by an angle of rotation between 5° and 180°, for example, i.e., to be arranged with an offset by an angle of rotation between 30° and 170° or by an angle of rotation between 70° and 150°, for example. In other words, if the furnace is in the melting position (and the melting-position gas supply devices are therefore in a position in which they can be arranged below the metal melt bath in such a way that they can optimally supply a treatment gas to the metal melt), then the furnace must be rotated about its axis of rotation by an angle of rotation which is given as defined above until it is in the gas treatment position (and the gas-treatment-position gas supply devices are thus in a position in which they can be arranged beneath the metal melt bath in such a way that they can optimally supply treatment gas to the metal melt).

The gas-treatment-position gas supply devices may be arranged on or adjacent to one of the two points of intersection of the maximum diameter of the cross-sectional area of the interior with the wall of the interior made of a refractory lining facing the interior. In this way the metal melt in the gas treatment position may be supplied with treatment gas in the area of the greatest bath depth.

In the same way, the melting-position gas supply devices can be arranged on or adjacent to one of the two points of intersection of the minimum diameter of the cross-sectional area of the interior with the wall of the interior which is made of a refractory lining and faces the interior. In this way the metal melt in the melting position can be supplied with treatment gas in the area of the greatest bath depth.

The axis of rotation may pass through the interior of the furnace.

If the interior has the shape of a cylinder, the axis of rotation of the furnace may run coaxially with the axis of the cylinder. According to another embodiment, the axis of rotation is offset to the axis of the cylinder of the interior.

For firing the interior of the furnace, it has at least one burner. The burner(s) may open into the interior at a side face on the axial end of the interior (side wall burner) or on an axial end area of the steel jacket (roof burner). The roof burners may open into the interior in an area adjacent to the side face of the interior.

If the axis of rotation of the furnace passes through the interior of the furnace, it is possible to provide for the side wall burner(s) to open into the interior where the axis of rotation intersects with the lining at one of the two axial end faces.

It is possible to provide for the side wall burner(s) or roof burner(s) to be installed in only one of the two axial end areas and for a device for removing the combustion gases from the interior to be arranged in the other axial end area of the interior. This gas-removing device may open into the interior either along the side of the interior or the lateral surface of the interior. In this embodiment, the combustion gases are introduced into the interior of the furnace in an axial end area and removed at the opposite end.

Any suitable burners according to the state of the art may be used as the burners here.

Alternatively, instead of a burner, a device for inductive melting of a nonferrous metal may also be used.

The inventive furnace may have at least one opening that opens from the outside into the interior for supplying a nonferrous metal into the interior. This opening may be designed to be of such dimensions that both a metal melt and scrap metal can be supplied to the interior through this opening.

The industrial furnace may have at least one other of the following openings which open from the outside into the interior: an opening for discharging a liquid nonferrous metal from the interior to the outside or a slag opening through which slag can be removed from the interior.

It is also possible for a nonferrous metal to be supplied to the furnace through a single opening and for molten nonferrous metal to be discharged from the furnace through the same opening.

The openings may be closable by a closing element such that even molten metal cannot penetrate through these openings from the interior to the outside when the metal melt is applying a load to this locking element in the interior, e.g., when the locking element and/or the opening is below the bath surface.

The inventive industrial furnace is held together by an outer steel jacket.

The steel jacket may have any desired cross-sectional area, e.g., an elliptical, oval, circular or polygonal cross-sectional area (i.e., quadrilateral or octagonal, for example).

To rotate the inventive furnace about its longitudinal axis, it is essentially possible to rely on the known state of the art for rotating and/or tilting a furnace for treatment of nonferrous metals.

If the steel jacket has a circular cross-sectional area (at least in its lower area), it may be mounted here on a roller bed and rotated about its axis of rotation on the rollers.

According to another embodiment, the furnace may be designed to be tiltable and may be tilted about the bearing by a tilting mechanism, e.g., a hydraulic tilting mechanism.

On the inside of the steel jacket there is a refractory lining which surrounds the free interior space. For the choice of refractory material for this refractory lining, it is possible to rely on the known state of the art for lining furnaces for the treatment of nonferrous metals. For example, magnesia chromium bricks, aluminum silicate bricks or silicon carbide bricks may be used.

The refractory lining is preferably arranged in a self-supporting manner in the steel jacket. A corresponding self-supporting arrangement of refractory material is known in the state of the art for drum rotary furnaces or tubular rotary furnaces (for firing cement). The bricks need not be attached to the surrounding steel jacket by any holding elements but instead are supported mutually in the form of a 360-degree arc. The furnace could therefore be rotated 360° about its longitudinal axis.

The inventive industrial furnace may be used for treating any nonferrous metal such as copper, lead, nickel, aluminum, tin or zinc or alloys thereof. However it is preferred for use in treating copper.

All the features of the inventive industrial furnace disclosed in this patent application may be combined together in any manner and in fact may be used either individually or in any combination.

Additional features of the furnace are derived from the other application documents, in particular the figures.

An exemplary embodiment of the inventive furnace is described in greater detail in the following description of the figures.

The illustrations show, in highly schematic diagrams.

Figure 1:
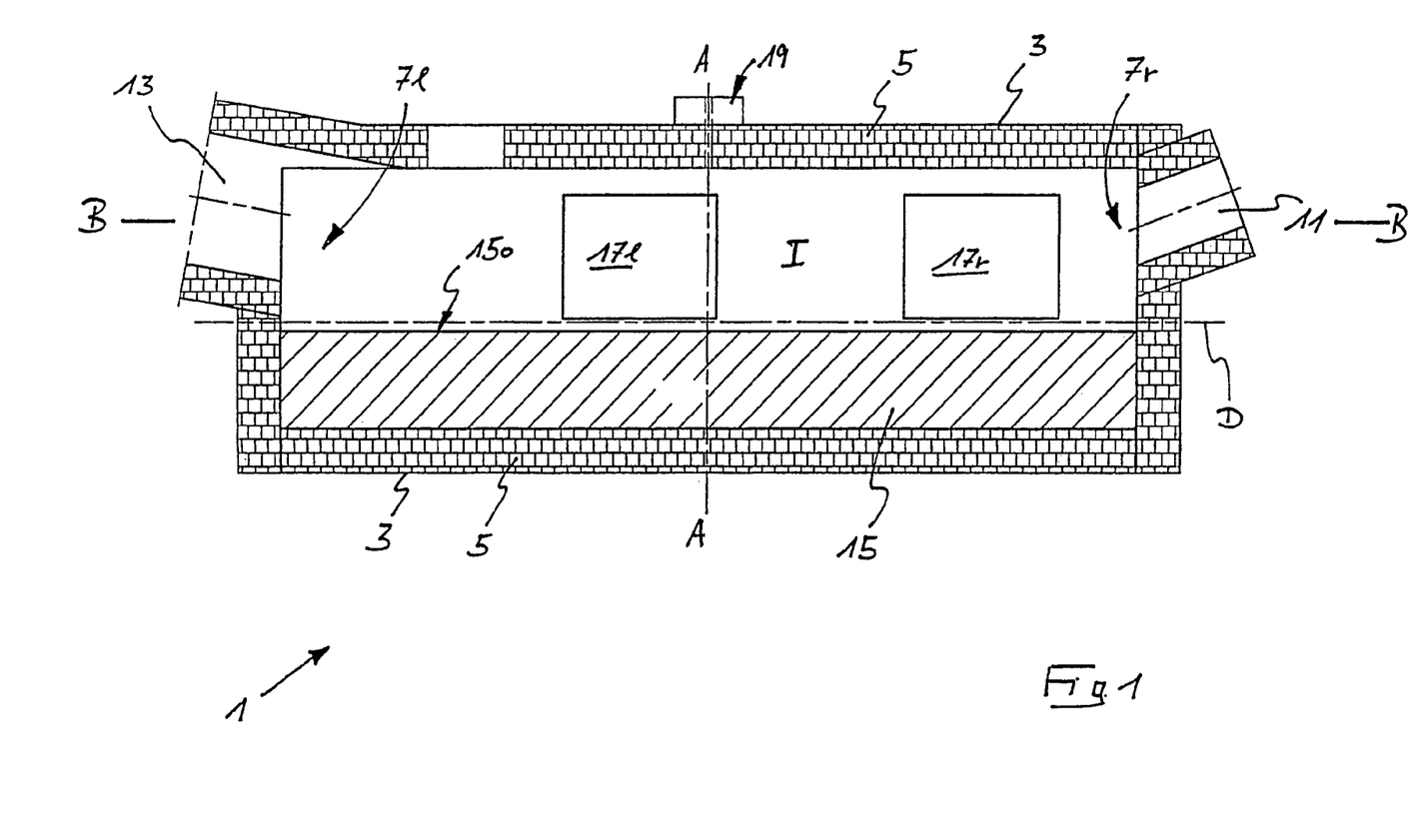
FIG. 1 a view of the furnace from the side along a section parallel to the axis of rotation.

The furnace labeled as one in its totality in FIG. 1 has essentially the outer shape of a cylinder with an oval cross-sectional area, where the axis of the cylinder runs coaxially with the axis of rotation D of the furnace 1.

The furnace 1 in FIG. 1 is in the melting position.

The furnace 1 has an outer steel jacket 3 which has a refractory lining 5 of a magnesia-chromium material provided on its inside surface, enclosing a free interior space I.

The interior space I is also in the shape of a cylinder having an oval cross-sectional area, whereby the axis of the cylinder runs coaxially with the axis of rotation D of the furnace 1.

Two side wall burners 9, 11 (only burner 11 can be seen in FIG. 1) open into the interior space I on one of the two axial end faces 7r (at the right in FIG. 1). On the opposite side face 7l an opening 13 opens, through which combustion exhaust gases and reaction products such as airborne dust and process exhaust gas can be removed from the interior I, into the interior I.

The interior I forms a channel on its lower side in which a copper melt 15 is situated, indicated by hatching.

The lateral surface of the furnace I has a plurality of openings 17l, 17r, 19, each opening through the steel jacket 3 and the lining 5 into the interior I.

In the melting position according to FIG. 1, the openings 13, 17l, 17r, 19 and the burner 9, 11 open into the interior space I above the surface 15o of the melt bath 15.

Through the openings 17l, 17r, the furnace 1 can be charged with a copper melt and/or with copper scrap. The openings 17l, 17r are situated in the lateral area of the lateral surface.

The opening 19 serves to direct the copper melt 15 out of the interior I of the furnace 1. The opening 19 is situated in the upper area of the lateral surface.

Figure 2:
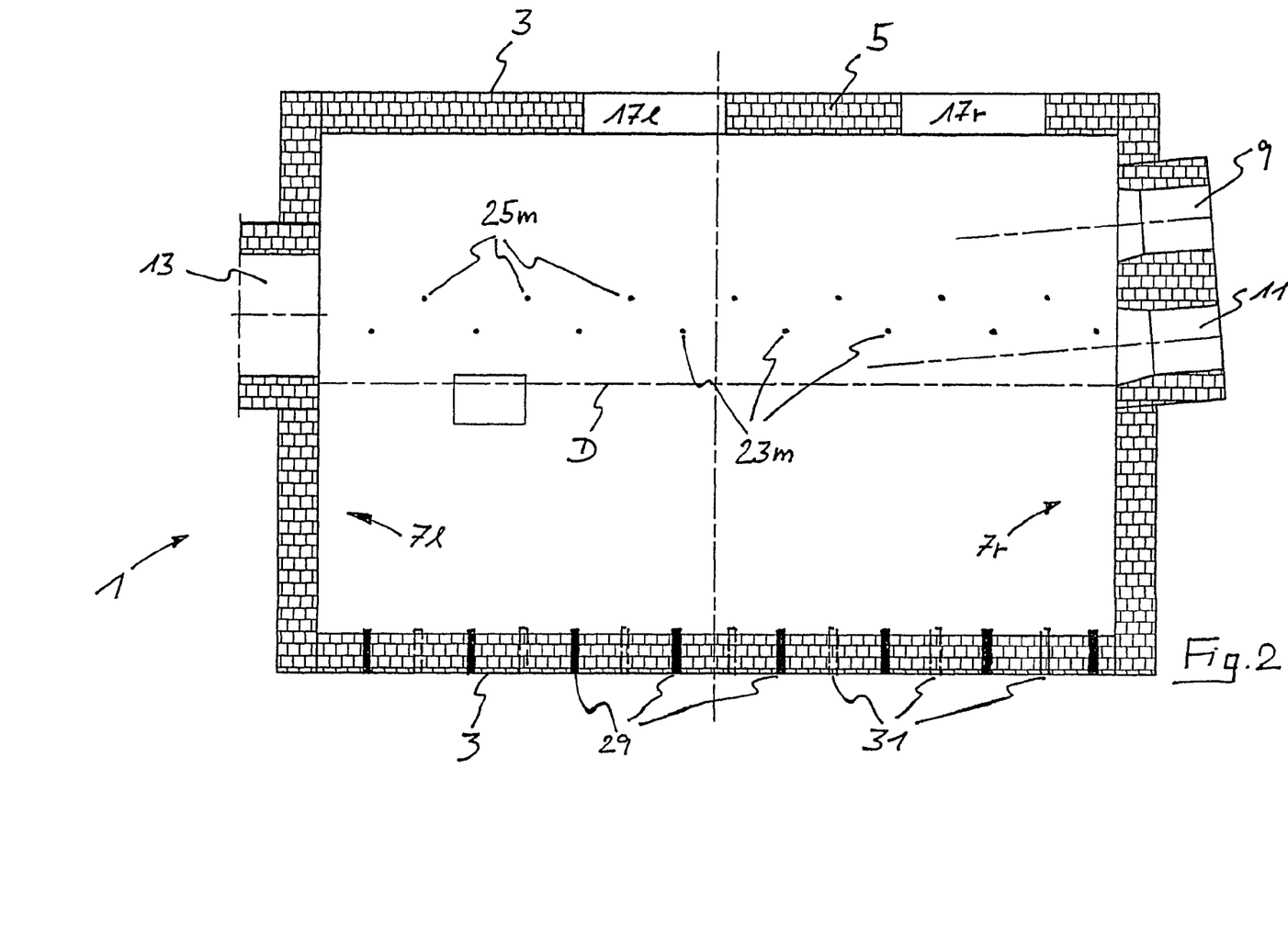
FIG. 2 a view of the furnace from above along a section on the line B-B according to FIG. 1 parallel to the axis of rotation.

FIG. 2 shows the furnace 1 according to FIG. 1 as seen from above, namely along the sectional B-B according to FIG. 1.

It can be seen here that the two burners 9, 11 open into the interior I with a lateral offset at the side of the axis of rotation D.

Figure 3:
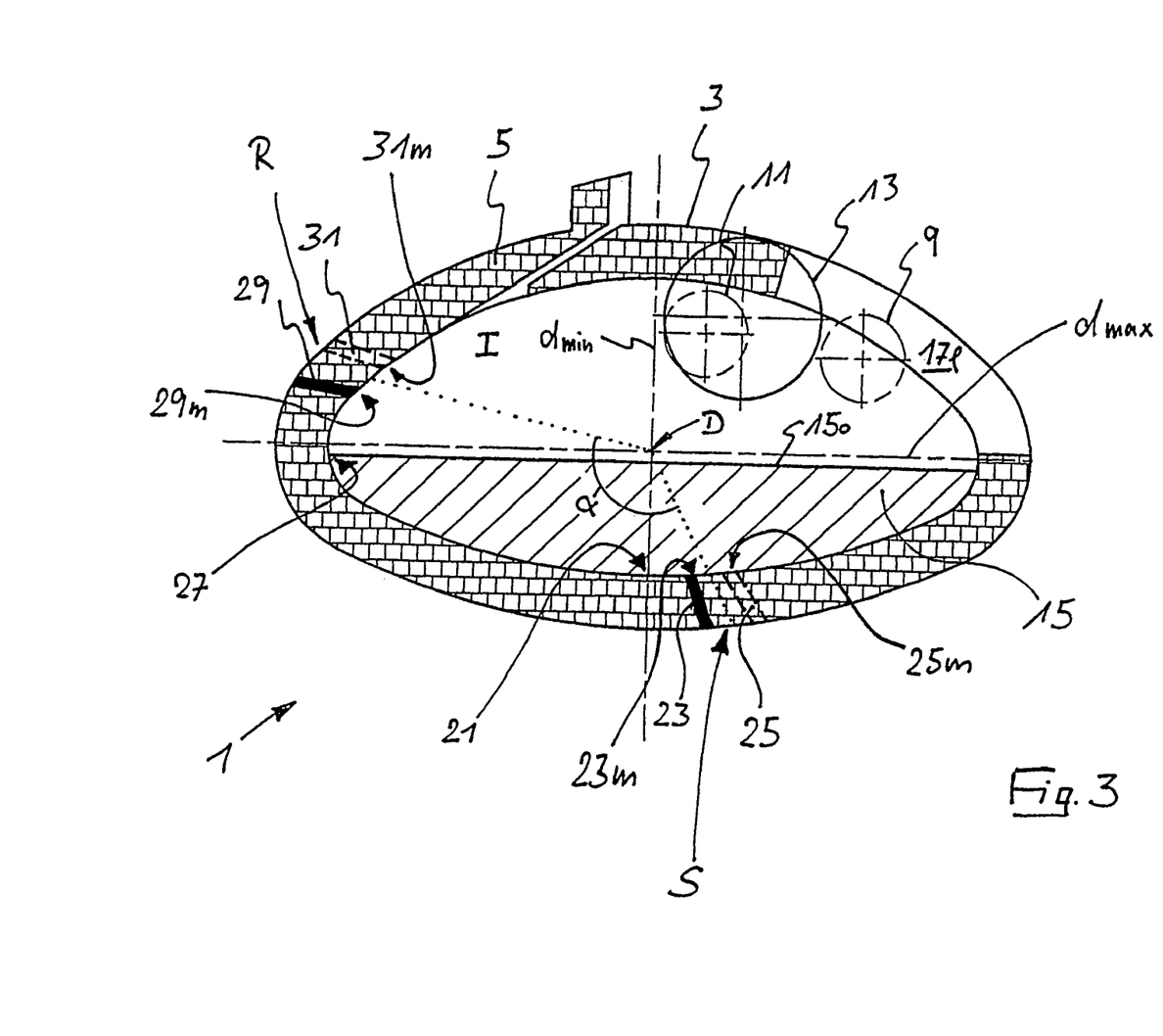
FIG. 3 a view of the furnace from the side along a section on line A-A according to FIG. 1 perpendicular to the axis of rotation.

FIG. 3 shows a view of the furnace 1 on a section along A-A according to FIG. 1, illustrating the oval cross-sectional area of the interior I.

The shorter main axis (minimum diameter) of the cross-sectional area of the interior I is labeled as $d_{min}$ and its longer main axis (maximum diameter) is labeled as $d_{max}$. The longer main axis $d_{max}$ and the shorter main axis $d_{min}$ form an angle of 90° to one another.

The axis of rotation D of the furnace 1 stands perpendicular to the plane of the drawing and intersects the latter at the point of intersection of the two main axes $d_{min}$, $d_{max}$ of the cross-sectional area.

As stated previously, the furnace 1 in FIG. 3 is in its melting position. Accordingly, the longer main axis $d_{max}$ of the cross-sectional area of the interior I runs horizontally and the shorter main axis $d_{min}$ runs vertically.

An area S in which several melting-position gas supply devices in the form of nozzles 23, 25 open into the interior I runs near the lower point of intersection 21 of the shorter main axis $d_{min}$ with the wall of the interior I, which is formed by the refractory lining 5 and faces the interior I.

The melting-position gas supply devices 23, 25 are arranged in such a way that some of them open into the interior I with their orifice points 23m along a first path and the others open into the interior I with their opening points 25m along a second path. The orifice points 23m, 25m are arranged with an offset in relation to one another from one path to the next. The two paths each run perpendicular to the plane of the drawing in FIG. 3, passing through the orifice point 23m and 25m, respectively.

Both paths run parallel to the axis of rotation D accordingly. For the sake of illustration, the path of the orifice points 23m, 25m is indicated in FIG. 2, where the orifice points in FIG. 2 are located beneath the plane of the drawing.

Adjacent to a lateral intersection point 27 (on the left here) of the longer main axis $d_{max}$ with the wall of the interior I facing the interior I there runs an area R in which several gas-treatment-position gas supply devices in the form of nozzles 29, 31 open into the interior I in a corresponding manner like the melting-position gas supply devices 23, 25.

The two paths along which the orifice points 29m, 31m of the gas-treatment-position gas supply devices 29, 31 are arranged also run parallel to the access of rotation D accordingly.

When the orifice points 29m, 31m of the gas-treatment-position gas supply devices 29, 31 are in the melting position according to FIG. 3, they open into the interior I above the surface 15o of the melt bath 15, but when the orifice points 23m, 25m of the melting-position gas supply devices 23, 25 are in the melting position according to FIG. 3, they naturally run into the interior I beneath the surface 15o of the melting bath 15.

The area in which the melting-position gas supply devices 23, 25 open into the interior I and the area in which the gas-treatment-position gas supply devices 29, 31 open into the interior I are offset in relation to one another by an angle of rotation α of 130° in FIG. 3.

For the sake of illustration, the gas-treatment-position gas supply devices 29, 31 are shown in FIG. 2. A first portion of the gas-treatment-position gas supply devices labeled as 29 are situated in a plane slightly above the plane of the drawing while another portion of the gas-treatment-position gas supply devices labeled with reference number 31 is offset to the former in another plane above the aforementioned plane.

The position of the burners 9, 11 and the opening 13 is indicated by circles.

It can be seen well in FIG. 3 that the metal melt 15 has only a low bath depth simultaneously with a large bath surface 15o facing the interior I. Therefore, the combustion gases present in the free part of the interior I are in direct contact with the bath surface 15o of the metal melt 15, said surface being relatively large when in the melting position. Accordingly, the metal melt 15 can be heated very rapidly and efficiently and therefore copper scrap can be melted down rapidly and efficiently.

At the same time, gas can be supplied to the metal melt 15 through the melting-position gas supply devices 23, 25 to allow treatment of the metal melt. However, since the metal melt has only a relatively small bath height, the gases injected into the metal melt flow relatively rapidly to the bath surface 15o of the metal melt 15 and therefore they remain in the metal melt 15 for only a relatively short period of time, so that there cannot be efficient treatment of the metal melt 15.

To be able to treat the metal melt 15 efficiently, the furnace 1 is moved into the gas treatment position. To do so, the furnace 1 is rotated counterclockwise out of its melting position according to FIG. 3 by 90° about its axis of rotation D until reaching the gas treatment position illustrated in FIG. 4.

Figure 4:
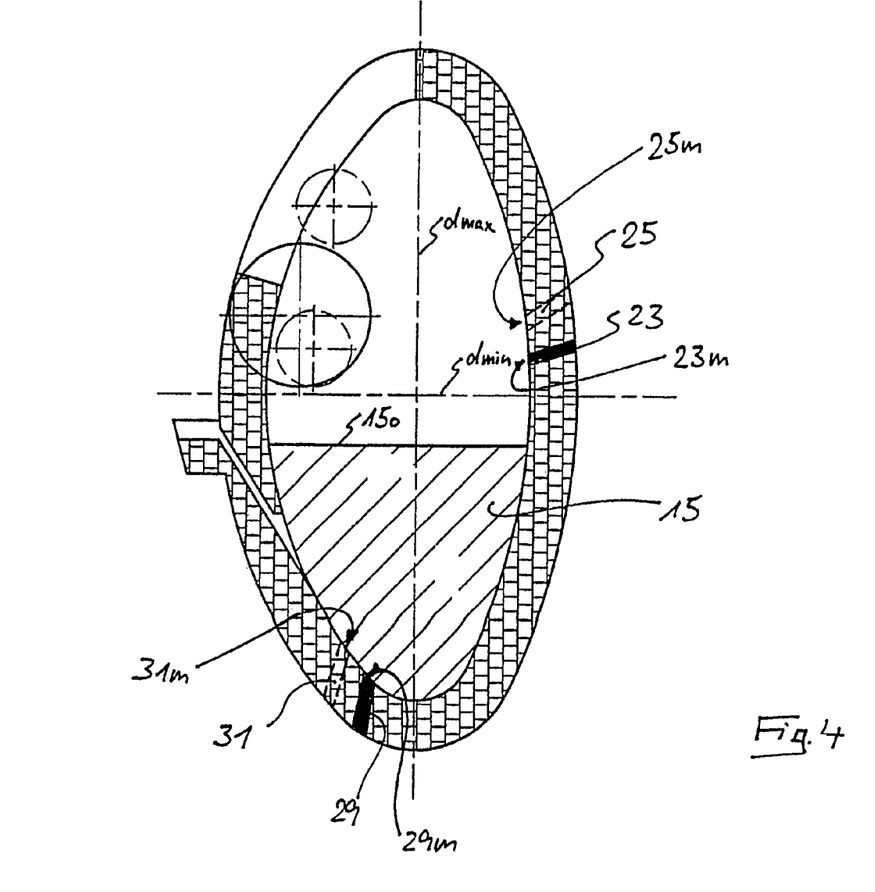
FIG. 4 a view of the furnace according to FIG. 3 but rotated by an angle of rotation of 90°.

In the gas treatment position according to FIG. 4, the shorter main axis $d_{min}$ runs horizontally and the orifice points 29m, 31m of the gas-treatment-position gas supply devices 29, 31 are situated beneath the bath surface 15o, while the orifice points 23m, 25m of the melting-position gas supply devices 23, 25 are situated above the bath surface 15o.

In the gas treatment position, a treatment gas can now be supplied to the metal melt 15 through the gas-treatment-position gas supply devices 29, 31, thereby inducing effective refining and/or homogeneous mixing due to the fact that the bath height is relatively high and the gas travels a relatively long distance through the metal melt from the orifice points 29m, 31m of the gas injection to the bath surface 15o and therefore the gas has relatively long time to treat the metal melt 15 effectively.

Figure 5:
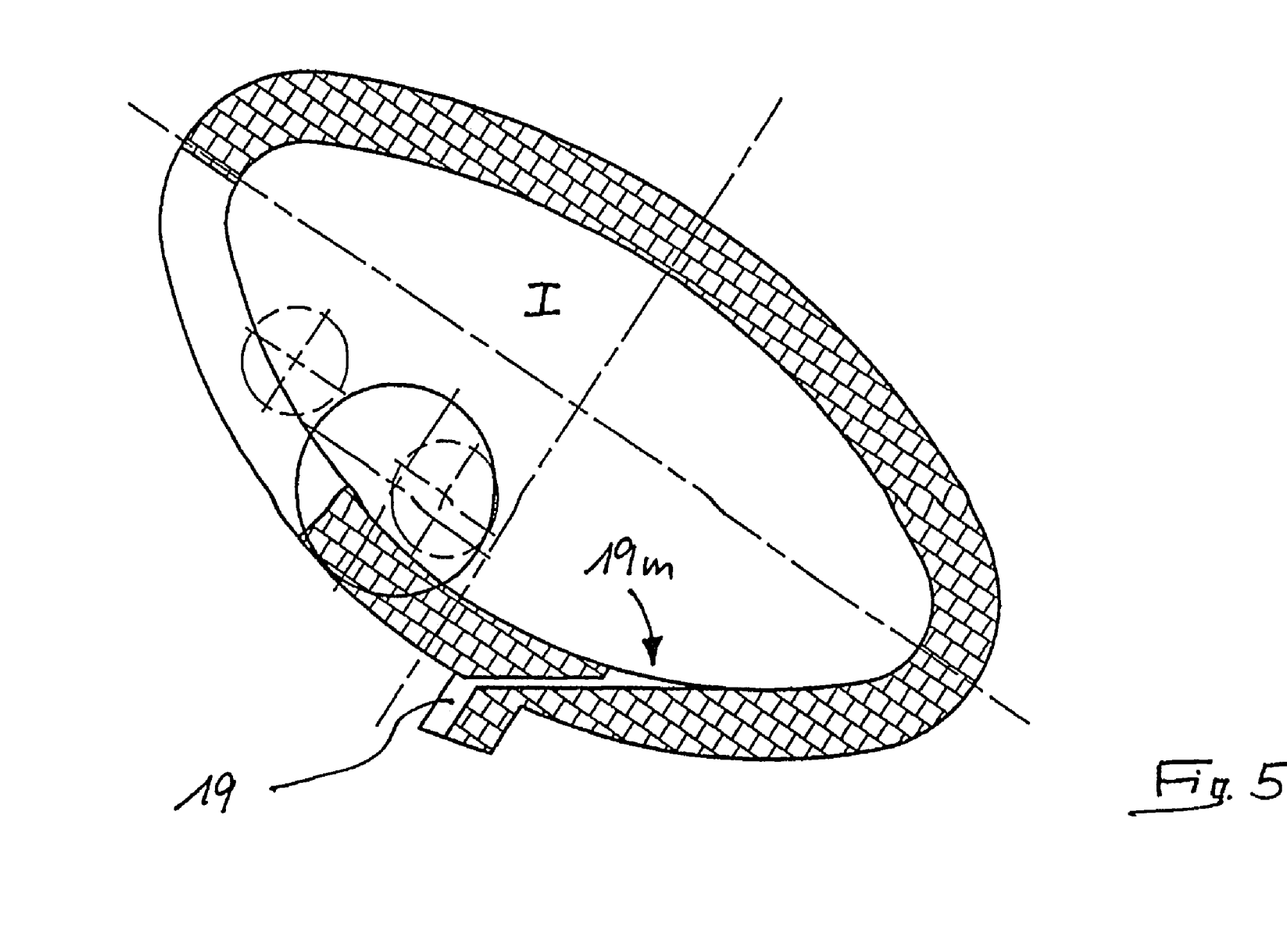
FIG. 5 a view of the furnace according to FIG. 3 but rotated by an angle of rotation of 147°.

In counterclockwise rotation of the furnace 1 about the axis of rotation by another 57° (i.e., by an angle of rotation of a total of 147° with regard to the melting position), the furnace 1 is in its casting position according to FIG. 5. In this position, the orifice point 19 of the opening 19 for discharging the metal melt out of the interior I as well as its outlet are situated on the outside of the furnace 1 beneath the bath surface of the metal melt so the metal melt can be discharged from the interior I of the furnace 1.

The invention claimed is:

1. An industrial furnace for melting and gas-treating non-ferrous metals having the following features:
  a) a steel jacket (3);
  b) a refractory lining (5) provided on the inside of the steel jacket (3) surrounding a free interior (I);
  c) devices (23, 25, 29, 31) for supplying gas to the interior (I), the devices (23, 25, 29, 31) extending through the refractory lining (5) in a direction transverse to a horizontal axis of rotation (D) of the furnace (1);
  d) at least one burner (9, 11) for firing the interior (I);
  e) the furnace (1) is mounted to rotate about the horizontal axis of rotation (D) between a melting-position and a gas-treatment-position by an angle of rotation of at least 40°;
  f) the interior (I) is in the shape of a cylinder having an elliptical or oval cross-sectional area with a maximum diameter and a minimum diameter; and
  g) the devices (29, 31) for supplying gas to the interior (I) being disposed on or adjacent to a location where the maximum diameter of the cross-sectional area of the interior (I) intersects the refractory lining (5) of the furnace (1) and the devices (23, 25) for supplying gas to the interior (I) being disposed on or adjacent to a location where the minimum diameter of the cross-sectional area of the interior (I) intersects the refractory lining (5) of the furnace (1).

2. The industrial furnace according to claim 1, wherein the elliptical or oval cross-sectional area includes two main axes, the longer of the two main axes of the ellipsis or the oval, respectively, is between 1.2 and 3 times longer than the shorter of the two main axes.

3. The industrial furnace according to claim 1, wherein the axis of the cylinder runs parallel to the axis of rotation (D).

4. The industrial furnace according to claim 1, wherein the axis of rotation (D) passes through the interior (I).

5. The industrial furnace according to claim 1, wherein the axis of rotation lies on the axis of the cylinder.

6. The industrial furnace according to claim 1, wherein the axis of rotation (D) is offset from the axis of the cylinder.

7. The industrial furnace according to claim 1, wherein the burner(s) (9, 11) open(s) into the interior (I) on one of the axial faces (7r) of the interior (I) or on an axial end area of the steel jacket (5), e.g., also as a roof burner.

8. The industrial furnace according to claim 7, wherein a device (13) for venting the combustion gases from the interior (I) is arranged on the other axial end face (71) of the interior (I) or on the other axial end area of the steel jacket (3).

9. The industrial furnace according to claim 1, wherein devices (23, 25, 29, 31) for supplying gas to the interior (I) open into the interior (I) at two areas (S, R) which are offset by an angle of rotation with respect to the axis of rotation (D) in relation to one another.

10. The industrial furnace according to claim 9, wherein the two areas (S, R) are arranged so they are offset in relation to one another by an angle of rotation between 5° and 180°.

11. The industrial furnace according to claim 9, wherein the two areas (S, R) are arranged so they are offset in relation to one another by an angle of rotation between 30° and 170°.

12. The industrial furnace according to claim 1, having at least one opening (17*l*, 17*r*) which opens into the interior (I) for supplying a nonferrous metal into the interior (I).

13. The industrial furnace according to claim 1, having at least one opening (19) that opens into the interior (I) for discharging a molten nonferrous metal from the interior (I) to the outside.

14. The industrial furnace according to claim 1, wherein the outside surface of the steel jacket (3) essentially has the shape of the lateral surface of a circular cylinder, a cylinder having an elliptical cross-sectional area or a cylinder having an oval cross-sectional area.

15. The industrial furnace according to claim 1, wherein the refractory lining (5) is arranged in a self-supporting manner in the steel jacket (3).

16. The industrial furnace according to claim 1, which is rotatable about the axis rotation (D) by an angle of rotation of at least 50° or at least 70°.

17. An industrial furnace for melting and gas-treating nonferrous metals comprised of:
   a) a steel jacket (3);
   b) a refractory lining (5) provided on an inside of the steel jacket (3), the refractory lining defining a free interior (I) having a noncircular cross-sectional area for holding a volume of a melt (15), a maximum diameter and a minimum diameter;
   c) at least one first gas supply device (23, 25) for supplying gas to the interior (I) when the furnace is in a melting-position, the at least one first gas supply device (23, 25) disposed on or adjacent to a location where the minimum diameter of the noncircular cross-sectional area of the interior (I) intersects the refractory lining (5) of the furnace;
   d) at least one second gas supply device (29, 31) for supplying gas to the interior (I) when the furnace is in a gas-treatment-position, the at least one second gas supply device (29, 31) disposed on or adjacent to a location where the maximum diameter of the noncircular cross-sectional area of the interior (I) intersects the refractory lining (5) of the furnace;
   e) at least one burner (9, 11) for firing the interior (I); and
   f) means for rotating the furnace about a horizontal axis of rotation (D) by an angle of rotation of at least 40° between the melting-position and the gas-treatment-position, wherein the at least one second gas supply device (29, 31) is disposed above the melt (15) and the at least one first gas supply device (23, 25) is disposed below the melt (15) when the furnace is in the melting-position and wherein the at least one first gas supply device (23, 25) is disposed above the melt (15) and the at least one second gas supply device (29, 31) is disposed below the melt (15) when the furnace is in the gas-treatment-position.

* * * * *